US010017020B2

(12) United States Patent
Andreasen et al.

(10) Patent No.: US 10,017,020 B2
(45) Date of Patent: Jul. 10, 2018

(54) PIVOTAL CONNECTION FOR HEAVY-DUTY VEHICLE SUSPENSION ASSEMBLY

(71) Applicant: Hendrickson USA, L.L.C., Itasca, IL (US)

(72) Inventors: Jacob D. Andreasen, Akron, OH (US); Jason M. Ramus, Canton, OH (US)

(73) Assignee: Hendrickson USA, L.L.C., Itasca, IL (US)

( * ) Notice: Subject to any disclaimer, the term of this patent is extended or adjusted under 35 U.S.C. 154(b) by 0 days.

(21) Appl. No.: 15/372,541

(22) Filed: Dec. 8, 2016

(65) Prior Publication Data

US 2017/0166024 A1 Jun. 15, 2017

Related U.S. Application Data

(60) Provisional application No. 62/265,616, filed on Dec. 10, 2015.

(51) Int. Cl.
*B60G 7/02* (2006.01)
*B62D 17/00* (2006.01)
*F16B 2/00* (2006.01)
*F16B 39/28* (2006.01)
*B60G 3/14* (2006.01)

(52) U.S. Cl.
CPC ............... *B60G 7/02* (2013.01); *B60G 3/145* (2013.01); *B62D 17/00* (2013.01); *F16B 2/005* (2013.01); *F16B 39/28* (2013.01); *B60G 2200/31* (2013.01); *B60G 2200/462* (2013.01); *B60G 2204/143* (2013.01); *B60G 2204/41* (2013.01); *B60G 2204/4302* (2013.01); *B60G 2204/4402* (2013.01); *B60G 2206/017* (2013.01); *B60G 2206/601* (2013.01); *B60G 2206/8207* (2013.01); *B60G 2300/026* (2013.01)

(58) Field of Classification Search
CPC ...... B60G 2206/601; B60G 7/02; F16B 2/005
See application file for complete search history.

(56) References Cited

U.S. PATENT DOCUMENTS 629,699 A * 7/1899 McQueen ................. E06B 3/44
16/220
2,008,003 A 7/1935 Carothers
(Continued)

FOREIGN PATENT DOCUMENTS

DE 3329967 A1 11/1984
DE 3411812 A1 7/1985
(Continued)

*Primary Examiner* — Nicole T Verley
(74) *Attorney, Agent, or Firm* — Dureska & Moore, LLC; David P. Dureska; Greg Strugalski

(57) ABSTRACT

A suspension assembly of an axle/suspension system for a heavy-duty vehicle is mounted on the heavy-duty vehicle frame or sub-frame via a beam of the suspension assembly which is pivotally connected to a hanger connected to the vehicle frame. The pivotal connection includes the hanger, the beam, a bushing assembly and a fastener group, and a textured feature formed in at least one of at least a portion of the hanger, at least a portion of the bushing assembly, or at least a portion of the fastening means so that the textured feature inhibits relative movement of the bushing assembly with respect to the hanger.

14 Claims, 11 Drawing Sheets

(56) References Cited

U.S. PATENT DOCUMENTS

| | | | | |
|---|---|---|---|---|
| 3,212,387 A * | 10/1965 | Madansky | | F16B 5/02 29/453 |
| 3,531,850 A * | 10/1970 | Durand | | F16B 2/005 29/432 |
| 3,856,424 A * | 12/1974 | Beck, Jr. | | F16B 2/005 403/227 |
| 4,333,222 A * | 6/1982 | Melin | | F16F 1/32 29/445 |
| 4,991,868 A | 2/1991 | VanDenberg | | |
| 5,037,126 A | 8/1991 | Gottschalk et al. | | |
| 5,145,143 A | 9/1992 | Jackson et al. | | |
| 6,916,037 B2 | 7/2005 | Baxter et al. | | |
| 7,207,583 B2 * | 4/2007 | Ross | | B60G 7/02 267/270 |
| 8,292,313 B2 | 10/2012 | Pierce et al. | | |
| 8,910,449 B2 * | 12/2014 | Burke | | F16B 43/02 411/368 |
| 9,586,452 B2 * | 3/2017 | Klaassen | | B60G 7/008 |
| 9,616,929 B2 * | 4/2017 | Levin | | B60G 7/02 |
| 2003/0132593 A1 | 7/2003 | Ross et al. | | |
| 2008/0003079 A1 * | 1/2008 | Martinson | | F16B 2/005 411/539 |
| 2009/0239092 A1 * | 9/2009 | Watanabe | | F16B 2/005 428/573 |
| 2013/0011217 A1 * | 1/2013 | Avellon | | F16B 2/005 411/500 |
| 2016/0121676 A1 * | 5/2016 | Drabon | | B60G 7/02 280/124.125 |
| 2016/0333727 A1 * | 11/2016 | Dibenedetto | | F01D 9/042 |
| 2017/0045080 A1 * | 2/2017 | Grether | | F16L 343/00 |

FOREIGN PATENT DOCUMENTS

| | | | | |
|---|---|---|---|---|
| EP | 1145878 | A2 | 10/2001 | |
| EP | 2495116 | A2 * | 9/2012 | B60G 7/02 |
| FR | 2715702 | | 8/1995 | |
| JP | 61248930 | A | 6/1986 | |

* cited by examiner

PIVOTAL CONNECTION FOR HEAVY-DUTY VEHICLE SUSPENSION ASSEMBLY

CROSS-REFERENCE TO RELATED APPLICATION

This application claims the benefit of U.S. Provisional Patent Application Ser. No. 62/265,616, filed Dec. 10, 2015.

BACKGROUND OF THE INVENTION

Field of the Invention

The subject matter relates to a frame and an axle/suspension system for a heavy-duty vehicle. More particularly, the disclosed subject matter is directed to a pivotal connection between a frame hanger and a beam of the axle/suspension system.

Background Art

Heavy-duty vehicles that transport cargo, for example, tractor-trailers or semi-trailers, and straight trucks such as dump trucks, typically include a leading or trailing arm axle/suspension system that connects an axle of the heavy-duty vehicle to a frame or sub-frame of the heavy-duty vehicle. Although such axle/suspension systems are found in widely varying structural forms, in general their structure is similar in that each axle/suspension system typically includes a pair of suspension assemblies. In some heavy-duty vehicles, the axle/suspension systems are connected directly to the primary frame of the heavy-duty vehicle. In other heavy-duty vehicles, the primary frame of the heavy-duty vehicle supports a sub-frame, and the axle/suspension systems connect directly to the sub-frame, which can be non-movable or movable, the latter being commonly referenced to as a slider box, slider sub-frame, slider undercarriage or secondary slider frame. For the purpose of convenience and clarity, reference herein will be made to a frame, with the understanding that such reference is by way of example, and that the disclosed subject matter applies to heavy-duty vehicle axle/suspension systems suspended from the longitudinally extending main members of primary frames, movable sub-frames and non-movable sub-frames.

The axle/suspension system is typically suspended from the frame by a pair of aligned and transversely spaced-apart hangers depending from the frame. Each hanger typically includes an outboard wall transversely spaced apart from an inboard wall. The outboard and inboard walls have respective openings and the openings are aligned with one another for providing a pivotal connection between the hanger and respective beam of the respective suspension assembly of the axle/suspension system through a bushing assembly and a fastener group. The hanger may optionally include a front wall which is connected to respective front portions of the outboard and inboard walls so that the hanger has a generally U-shaped horizontal cross-section. Typically, the hanger including only outboard and inboard walls is rigidly mounted to sidewalls of its respective frame main member, whereas the hanger including the front wall in addition to the outboard and inboard sidewalls is rigidly mounted to an underside of its respective frame main member. The fastener group includes bolts, nuts and washers and is used to pivotally connect the bushing assembly to the hanger. The washers may optionally include a concentric member and an eccentric member that enable adjustment of the alignment of the axle/suspension system.

The pivotal connection between the hanger and the beam of the axle/suspension assembly is a location of significant forces including fore-and-aft forces, vertical forces and side forces. This pivotal connection is the only connection between each suspension assembly of the axle/suspension system and the frame of the heavy-duty vehicle, other than an air spring and/or a shock absorber, as are well known. For reacting and/or absorbing the fore-and-aft forces, vertical and side forces, the pivotal connection should include a sufficiently secure clamping engagement between the hanger and the bushing assembly. Typically, the sufficiently secure clamping engagement is formed by aligning hanger openings and a bushing sleeve opening of the bushing assembly and fastening them by inserting a bolt of the fastener group through the openings and tightening the hanger walls against the bushing sleeve. During operation of the vehicle, the beam and its bushing tube can pivot about an elastomeric bushing of the bushing assembly.

In some prior art manufacturing processes, the frame is coated with a protective medium, such as wax to prevent or minimize corrosion and other damage. It has been found that the coated outboard and inboard surfaces of the hanger walls have a relatively low coefficient of friction, thereby inhibiting the secure clamping engagement between the hanger and the bushing assembly, and in turn providing less than an optimal pivotal connection for the suspension assembly to its respective hanger. In order to preserve a desired pivotal connection, contact areas on the outboard and inboard surfaces of each hanger wall must be painted with primer and/or masked off such as with a steel mask and a sealing foam. Such painting and/or masking prevents wax from adhering to that primer-painted and/or masked-off areas of the outboard and inboard surfaces of each hanger wall, thereby preserving better coefficient of friction in the contact areas after assembly of each suspension assembly to its respective hanger. However, the painting-and-masking technique/process is undesirably time-consuming and costly.

In other prior art manufacturing processes, the frame is coated with a protective medium, such as paint to prevent or minimize corrosion and other damage. It has been found that the coated outboard and inboard surfaces of the hanger walls have a relatively low coefficient of friction, thereby inhibiting the secure clamping engagement between the hanger and the bushing assembly, and in turn providing less than an optimal pivotal connection for the suspension assembly to its respective hanger. In order to preserve a desired pivotal connection, a prior art attempt was to use a washer having concentric grooves and a roughened surface on a portion that contacts the hanger. Each groove has a depth from about 1.6 mm (0.063 inch) to about 3.8 mm (0.150 inch). This attempt was found to be insufficient for paint coated hanger walls to provide the sufficient clamping engagement between the hanger and the bushing assembly, and in turn provided less than an optimal pivotal connection for the suspension assembly to its respective hanger.

As a result, there is a need for a structure for a heavy-duty vehicle that enables a frame to be coated with a protective medium but does not require a painting and/or masking process of the hangers that depend from the frame. Thus, undesirable cost and time can be avoided, and a desired pivotal connection is provided between the hanger and the beam of each suspension assembly of the heavy-duty vehicle axle/suspension system. The pivotal connection for suspension assemblies of heavy-duty vehicles of the disclosed subject matter satisfies this need.

SUMMARY OF THE INVENTION

One aspect of the disclosed subject matter is to provide a pivotal connection for an axle/suspension system of a heavy-duty vehicle that enables economical secure clamping engagement to be formed between a bushing assembly of each suspension assembly and its respective hanger to overcome any adverse effects of a protective medium on the hanger.

The pivotal connection according to the disclosed subject matter provides such secure clamping engagement for an axle/suspension assembly of a heavy-duty vehicle. A pivotal connection for a suspension assembly of an axle/suspension system for a heavy-duty vehicle includes a frame with a hanger connected to the frame of the heavy-duty vehicle. The hanger includes at least one wall with a surface defining an opening therethrough. The pivotal connection includes a beam of the suspension assembly. The pivotal connection includes a bushing assembly operatively connected to the beam for pivotally connecting the beam with the hanger. The pivotal connection includes fastening means for securing the bushing assembly to the hanger. The pivotal connection includes a textured feature formed in at least one of a portion of the hanger wall, a portion of the bushing assembly, or a portion of said fastener means, wherein the texture feature inhibits relative movement of the bushing assembly with respect to the hanger.

The disclosed subject matter also includes a method for providing a pivotal connection with secure clamping engagement for an axle/suspension assembly of a heavy-duty vehicle. The method includes the steps of providing a frame of a heavy-duty vehicle. A hanger is provided with at least one wall and a surface defining an opening. The hanger is connected to the frame. The frame and connected hanger assembly is coated with a protective medium. A beam of the suspension assembly is mounted for pivotal connection to the hanger. The mounting step includes providing a bushing assembly for pivotally connecting the hanger and the beam. The bushing assembly includes a bushing with a tubular bushing sleeve. The mounting step further includes providing fastening means for connecting the hanger and the bushing sleeve. The fastening means includes at least one bolt and nut. The bolt is inserted through the hanger wall opening and the tubular bushing sleeve. The hanger and the tubular bushing sleeve are clamped by tightening the bolt and the nut.

BRIEF DESCRIPTION OF THE DRAWINGS

An aspect of the disclosed subject matter is set forth in the following description and is shown in the drawings, and is particularly and distinctly pointed out and set forth in the appended claims.

Similar numerals refer to similar parts throughout the drawings.

DETAILED DESCRIPTION

Figure 1:
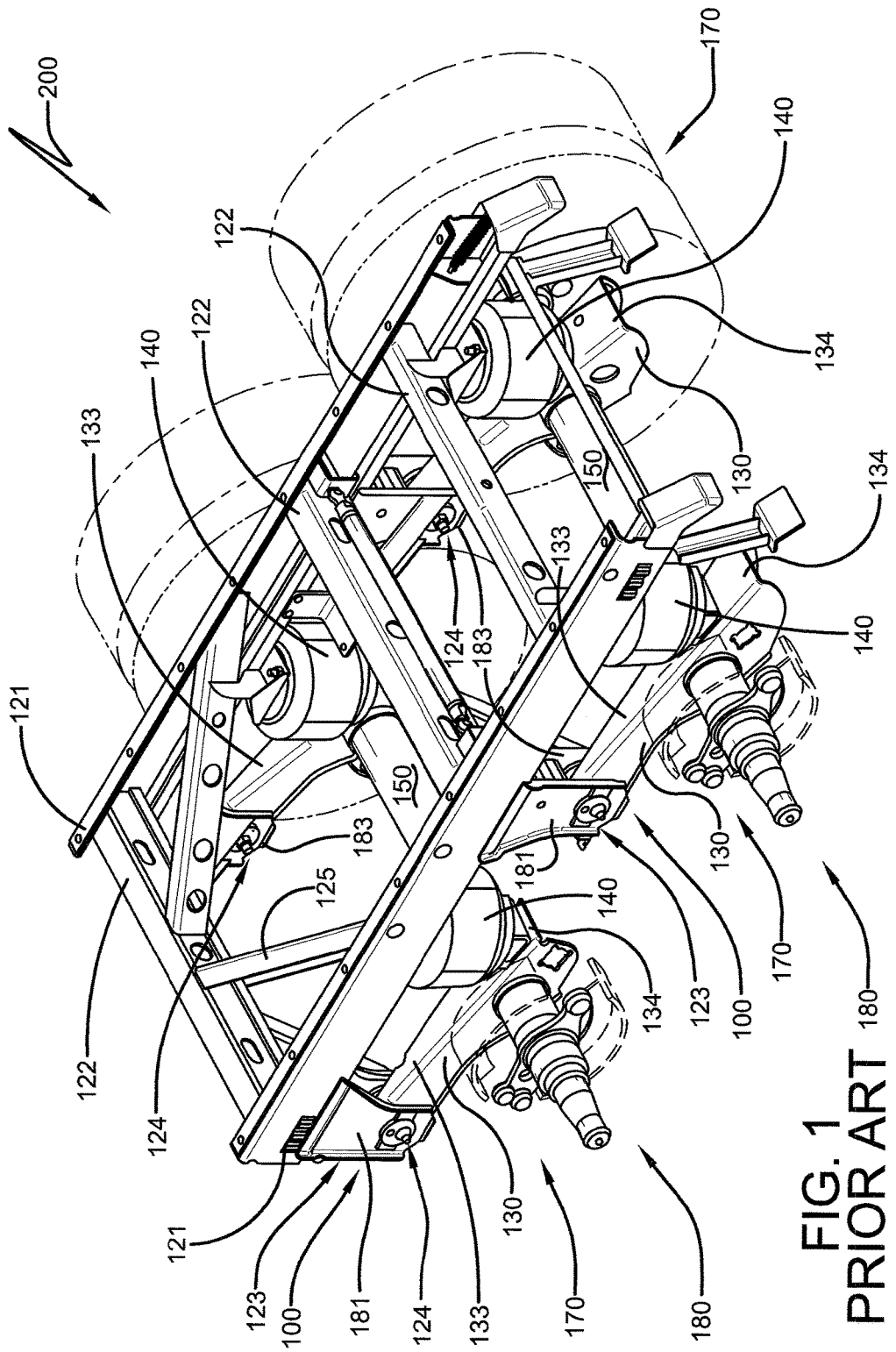
FIG. 1 is a perspective view of a prior art heavy-duty vehicle frame with a pair of axle/suspension systems pivotally connected to hangers depending from the frame.

In order to better understand the structure, assembly and operation of the pivotal connection for a suspension assembly of a heavy-duty vehicle axle/suspension system, the structure, assembly and operation of a prior art pivotal connection will be described below. A prior art pivotal connection 100 is shown in FIG. 1. Typically, pivotal connection 100 is incorporated into a heavy-duty vehicle frame 200. Pivotal connection 100 is provided between a hanger 123 and a trailing arm beam 130 through a bushing assembly 124 and fastening means or a fastener group 190 (FIG. 3) including a bolt 139, a pair of washers 138, a nut 137, and optionally a concentric member 136 and an eccentric member 135. Because an axle/suspension system generally includes an identical pair of suspension assemblies 170 which are connected to heavy-duty vehicle frame 200 by a respective one of a pair of pivotal connections 100, for sake of clarity only one of the suspension assemblies and respective pivotal connection will be described below.

Figures 2, 3:
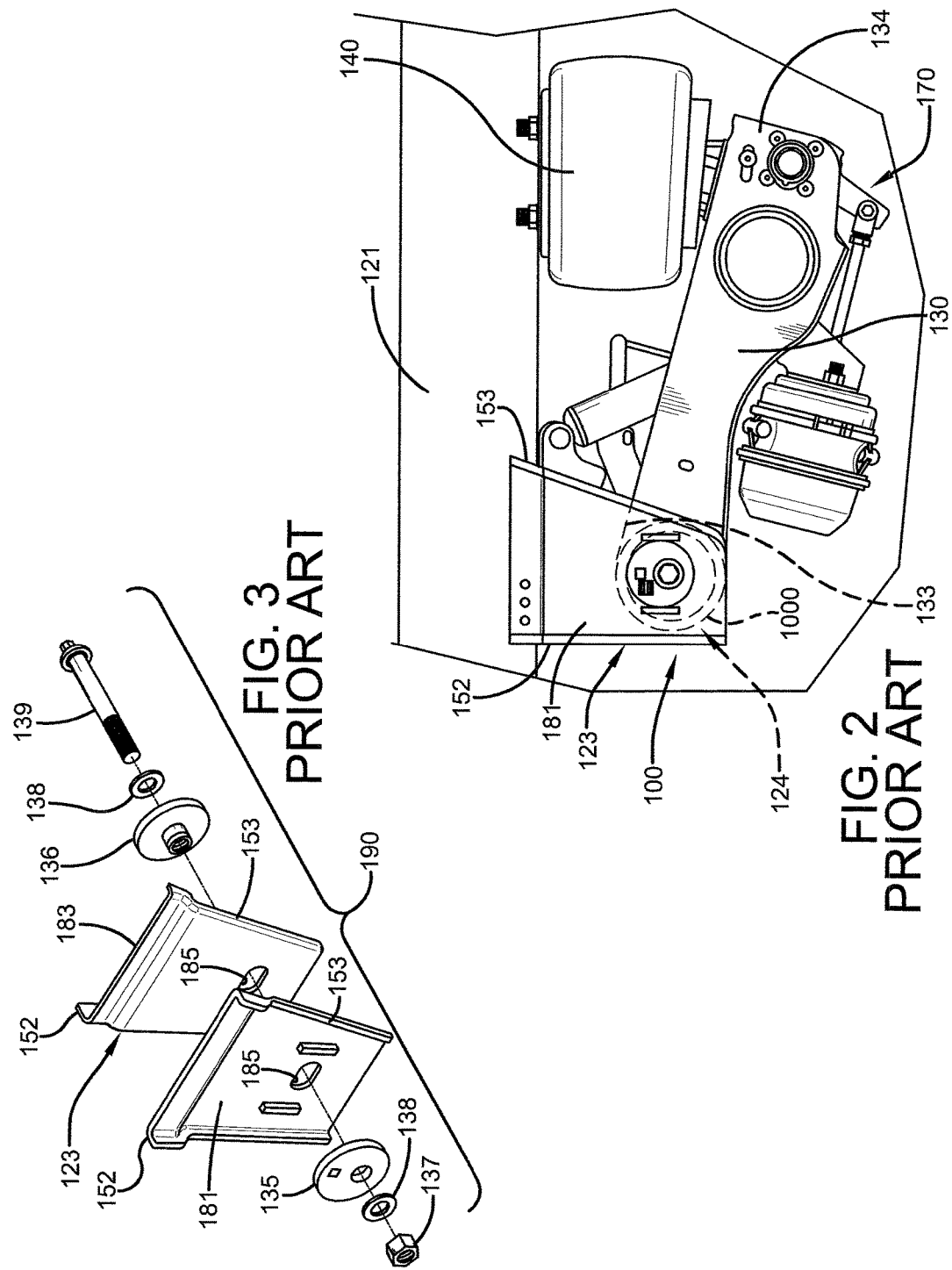
FIG. 2 is a fragmentary side elevational view of one of the prior art suspension assemblies of one of the axle/suspension systems.
FIG. 3 is an exploded perspective view of a prior art hanger and fastener group.

With reference to FIGS. 1-3, heavy-duty vehicle frame 200 typically includes a pair of longitudinally extending elongated main members 121 that are parallel to one another. A parallel transverse spacing between main members 121 is maintained by a plurality of cross members 122. Cross members 122 extend between and are welded to main members 121 to form interconnected frame 200. Front and rear pairs of prior art hangers 123 of frame 200 suspend tandem axle/suspension system 180 from main members 121. Each axle/suspension system 180 includes a transversely extending axle 150 connected to a pair of transversely spaced suspension assemblies 170. Hanger 123 includes an outboard wall 181 and an inboard wall 183, which are parallel, spaced apart from one another and interconnected. Hanger 123 is formed with a pair of front flanges 152 that each extend outwardly from the hanger generally perpendicular to respective ones of outboard wall 181 and inboard wall 183, and along a front edge of respective ones of the outboard and inboard walls. Hanger 123 is also formed with a pair of rear flanges 153 that each extend outwardly from the hanger generally perpendicular to respective ones of outboard wall 181 and inboard wall 183 and extend along a rear edge of respective ones of the outboard and inboard walls. Respective top ends outboard and inboard walls 181, 183, are rigidly mounted by suitable means such as bolting and/or welding to main member 121 of frame 200.

Pivotal connection 100 is provided between hanger 123 and beam 130 for mounting suspension assembly 170 on frame 200. More specifically, suspension assembly 170 is pivotally connected to hanger 123 via trailing arm beam 130 and bushing assembly 124 (FIG. 2). Beam 130 includes a front end portion 133 (FIG. 2) where bushing assembly 124 is disposed to facilitate pivotal connection 100 of beam 130 relative to hanger 123. Beam 130 also includes a rear end portion 134, which is welded or otherwise rigidly attached to transversely extending axle 150 (FIG. 1). Suspension assembly 170 also includes an air spring 140 mounted on and extending between beam rear end portion 134 and main member 121 of frame 200.

Figure 4:
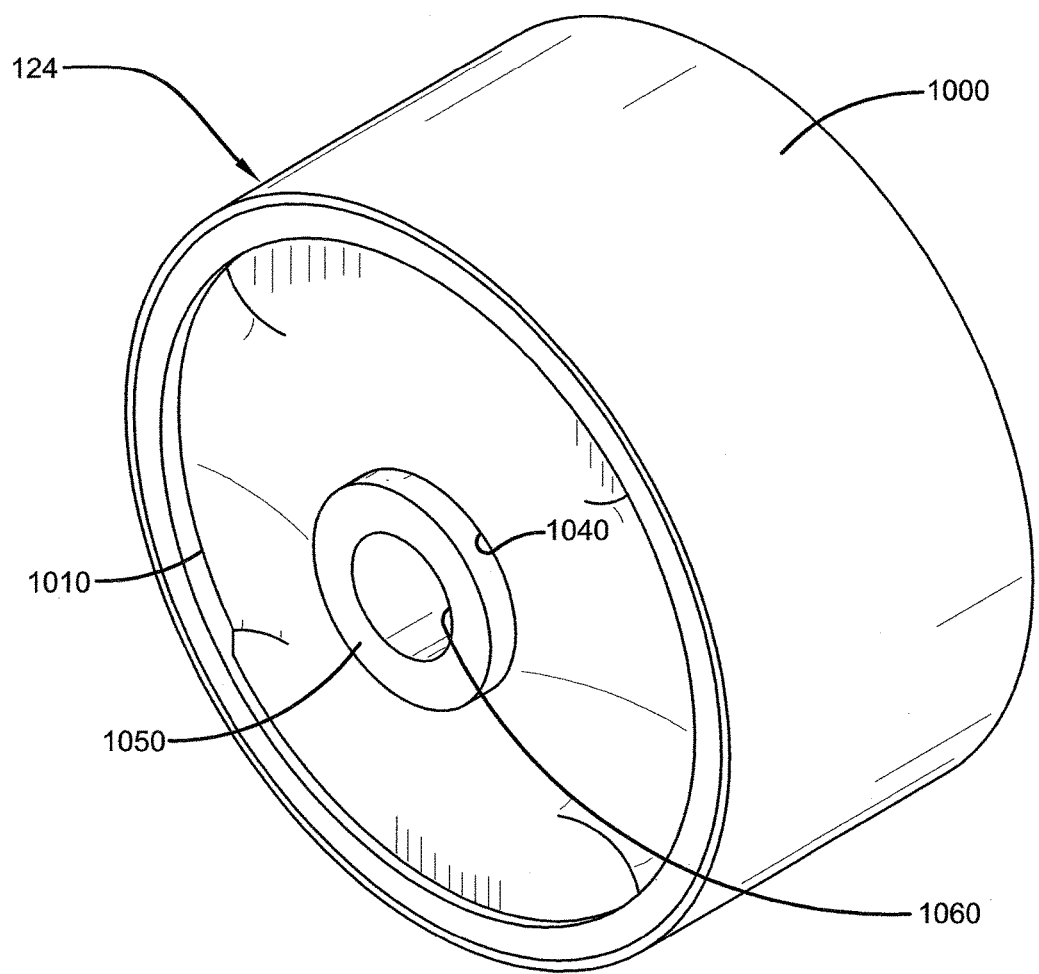
FIG. 4 is a perspective view of a prior art bushing assembly.
Figure 5:
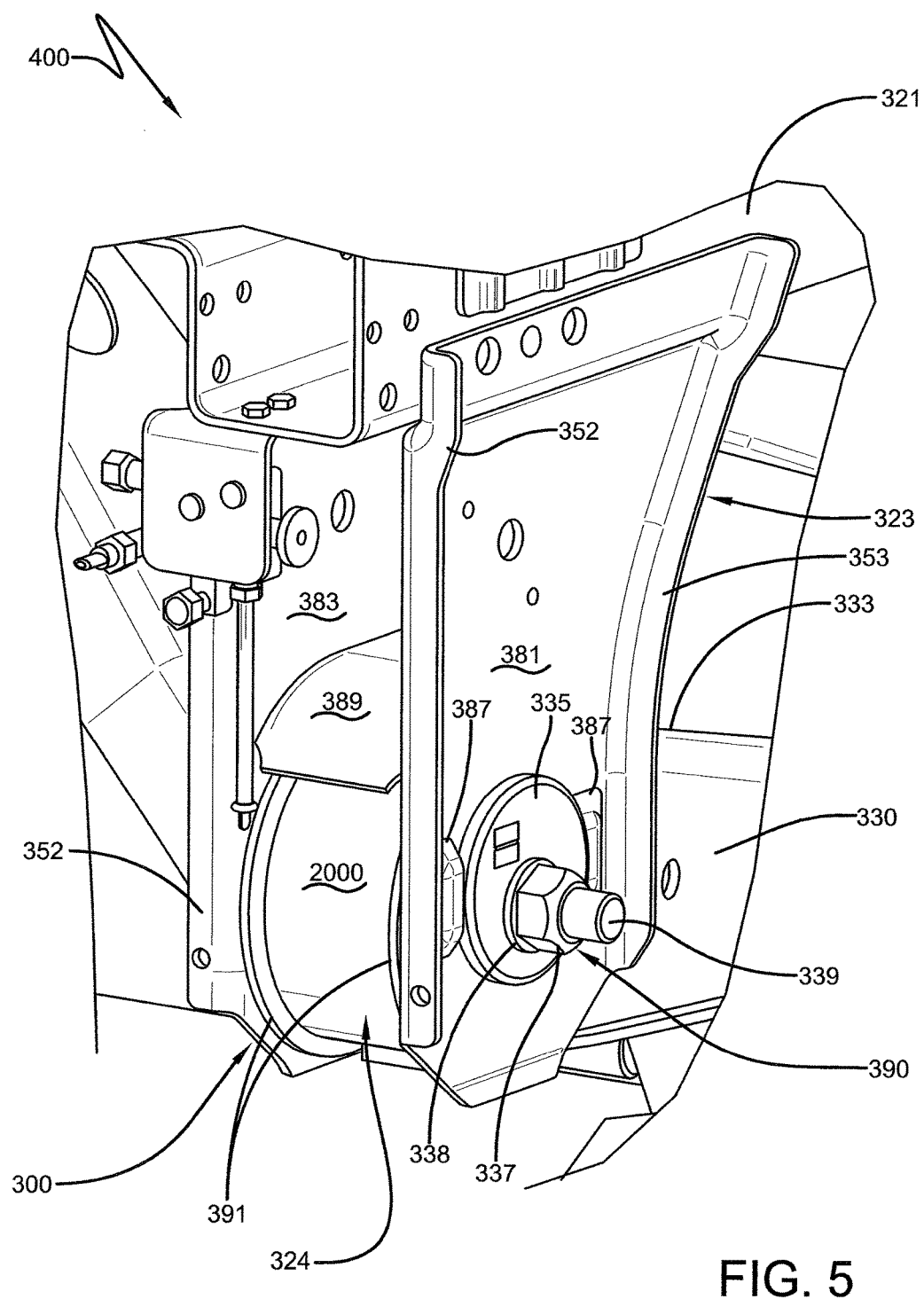
FIG. 5 is an enlarged fragmentary perspective view of a pivotal connection between a hanger and a beam of a suspension assembly constructed according to one aspect of the invention.
Figure 6:
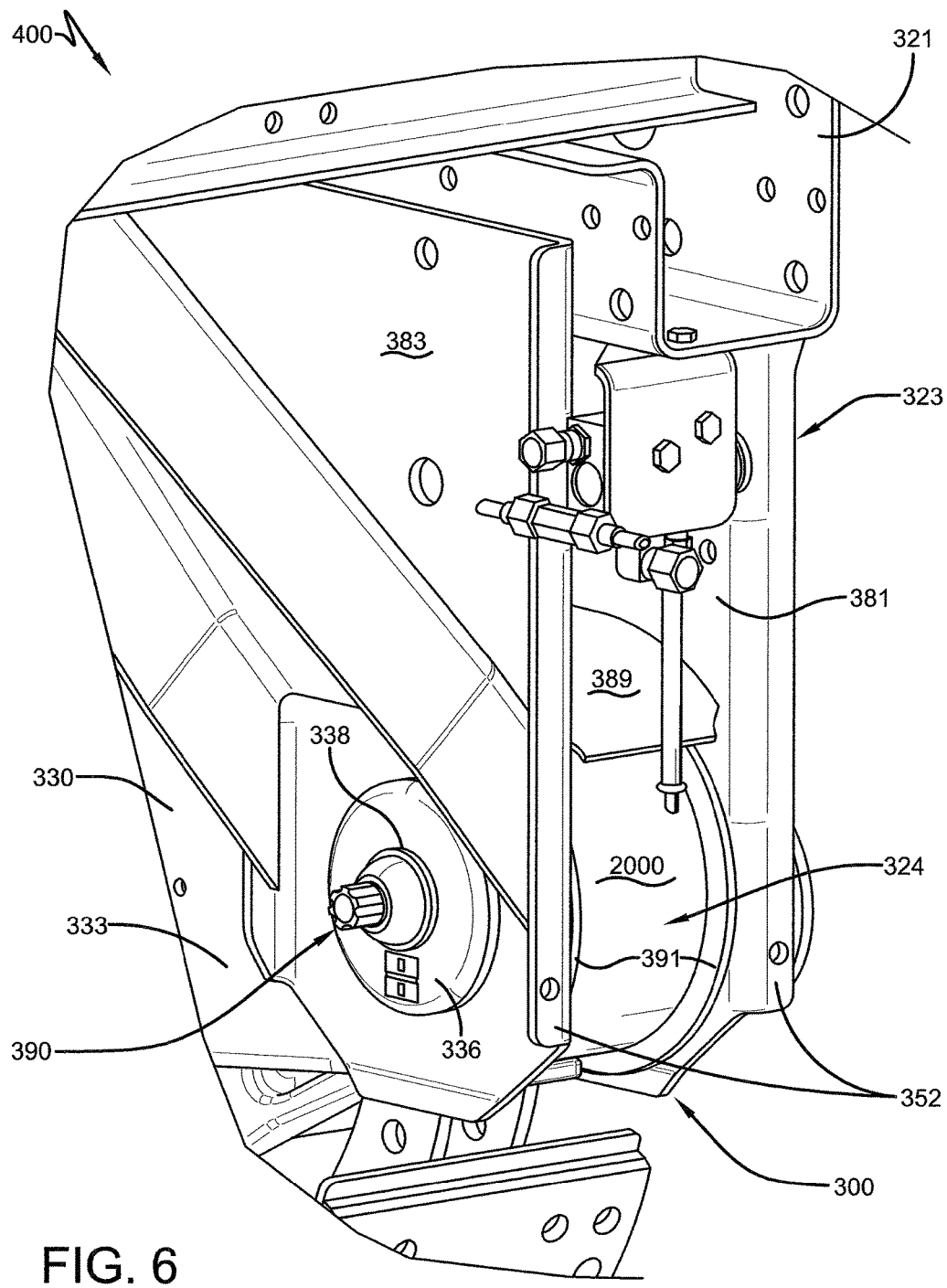
FIG. 6 is a fragmentary enlarged perspective view of the pivotal connection illustrated in FIG. 5 viewed from another direction.

With reference to FIGS. 2-4, bushing assembly 124 includes a beam mounting tube 1000 which is welded to beam front end portion 133. A bushing 1010 is press-fitted into beam mounting tube 1000 so that beam mounting tube 1000 can rotate or pivot with respect to bushing 1010 during operation of the vehicle, as is known in the art. Bushing 1010 includes an elastomeric, generally cylindrical-shaped body formed with a central opening 1040 in which a tubular rigid bushing sleeve 1050 is friction fitted and bonded thereto at the peripheral surface of bushing sleeve 1050 by any suitable adhesive. Bushing sleeve 1050 extends slightly outwardly from both ends of central opening 1040 of bushing 1010 to facilitate clamping between outboard and inboard hanger walls 181, 183 by inserting bolt 139 (FIG. 3) of fastener group 190 through an aligned pair of hanger wall openings 185 (FIG. 3) and a sleeve central continuous opening 1060 and a pair of wear pads (not shown). The pair of wear pads are formed of any suitable plastic, each one of the pair being loosely disposed over a respective one of the ends of bushing sleeve 1050.

During manufacture/assembly, frame 200, including hangers 123, is coated with a protective medium such as wax or paint to prevent or minimize corrosion and other damage. In order to be coated in an economical manner, frame 200 is dipped in a bath of a protective medium such as wax or the like. Frame 200 is coated in such a manner after hangers 123 are connected to frame main members 121, and before each axle/suspension system 180 is mounted on frame 200. The wax later hardens to form a protective coating on frame 200. It has been found that the coated outboard and inboard surfaces of hanger 123 have a relatively low coefficient of friction, which in turn adversely affects the secure clamping engagement formed between hanger 123, bushing sleeve 1050 and fastener group 190, once these clamp group components are aligned and fastened. This relatively reduced clamping engagement may allow unwanted relative movement of bushing sleeve 1050 with respect to hanger 123 in fore-aft, vertical and/or transverse directions, which can possibly cause undesirable wear and tear in contact areas formed between bushing sleeve 1050 and hanger walls 181, 183. The undesirable wear and tear can possibly harm the integrity of hanger 123 and bushing assembly 124, and therefore provide less than an optimum pivotal connection 100 between hanger 123 and beam 130 of suspension assembly 170. In order to preserve the desired pivotal connection, areas on outboard and inboard walls 181, 183 of hanger 123 that contact bushing sleeve 1050 and fastener group 190, as well as bolt 139, washers 138, nut 137, concentric member 136 and eccentric member 135 must be painted with primer and/or masked off such as with a steel mask and a sealing foam. Such painting and masking prevents wax from adhering to primer-painted and/or masked-off contact areas in the outboard and inboard walls 181, 183 of hanger 123, thereby preserving a sufficient coefficient of friction of hangers 123 at the contact areas and in turn preserving the ability of each respective hanger wall to be frictionally contacted by bushing sleeve 1050 and securely clamped by fastener group 190. This secure clamping engagement enhances the desired pivotal connection of hanger 123 and beam 130 by inhibiting the unwanted relative movement of bushing sleeve 1050 with respect to hanger 123 in fore-aft, vertical and/or transverse directions, in turn preventing or minimizing undesirable wear and tear in the contact areas.

Prior art pivotal connection 100 of the hanger to the bushing assembly and the beam of the axle/suspension assembly has certain constraints due to its structure. Because prior art pivotal connection 100 includes a protective medium coating of hanger 123, which requires a time and cost consuming painting and/or masking process, it makes it difficult to provide an economically desired pivotal connection between hanger 123 and beam 130 of suspension assembly 170. A pivotal connection between a hanger and a beam of a suspension assembly of the disclosed subject matter overcomes the deficiencies of prior art pivotal connection 100 described above, and will now be described.

Turning now to FIGS. 5-8, a pivotal connection for a suspension assembly (not completely shown) of an axle/suspension system (not completely shown) for heavy-duty vehicles of the disclosed subject matter is shown at reference numeral 300. Pivotal connection 300 is incorporated into a frame 400 for mounting a suspension assembly on frame 400 of a heavy-duty vehicle. Pivotal connection 300 is provided between a hanger 323 and a trailing arm beam 330 through a bushing assembly 324 and fastening means or a fastener group 390. The fastener group includes a bolt 339, a pair of washers 338, a nut 337, a concentric member 336 and an eccentric member 335. Because the axle/suspension system generally includes an identical pair of suspension assemblies which are connected to frame 400 by respective ones of a pair of pivotal connections 300, for sake of clarity only one of the suspension assemblies and its respective pivotal connection will be described.

Pivotal connection 300 includes structural and operational differences from prior art pivotal connection 100 in that pivotal connection 300 includes textured features formed in hanger 323, bushing sleeve 2050 of bushing assembly 324, and/or a concentric or eccentric members 336, 335 of fastener group 390. The structural and operational differences of the disclosed subject matter now will be described.

With reference to FIGS. 5-9, each hanger 323 for pivotally mounting its respective suspension assembly of the axle/suspension system depends from its respective main member 321 of frame 400. Hangers 323 of the axle/suspension system are transversely spaced from one another. Hangers 323 have similar structures and for the sake of clarity and conciseness, only one of the hangers 323 will be described. Hanger 323 includes an outboard wall 381 and an inboard wall 383, which are parallel and transversely spaced apart from one another, and are interconnected by a shelf 389, which extends between and is attached to outboard wall 381 and inboard wall 383 by suitable means. Hanger 323 is formed with a pair of front flanges 352 that each extend outwardly from the hanger generally perpendicular to respective ones of outboard wall 381 and inboard wall 383 and along a front edge of respective ones of the outboard and inboard walls. Hanger 323 is also formed with a pair of rear flanges 353 that each extend outwardly from the hanger generally perpendicular to respective ones of outboard wall 381 and inboard wall 383 and extend along a rear edge of respective ones of the outboard and inboard walls. Respective top ends of outboard and inboard walls 381, 383, are rigidly mounted by suitable means such as bolting and/or welding to main member 321. Hanger 323 may optionally include a front wall which is connected to and extends between the front end of outboard and inboard walls 381, 383 to form a generally U-shaped horizontal cross-section.

Figure 7:
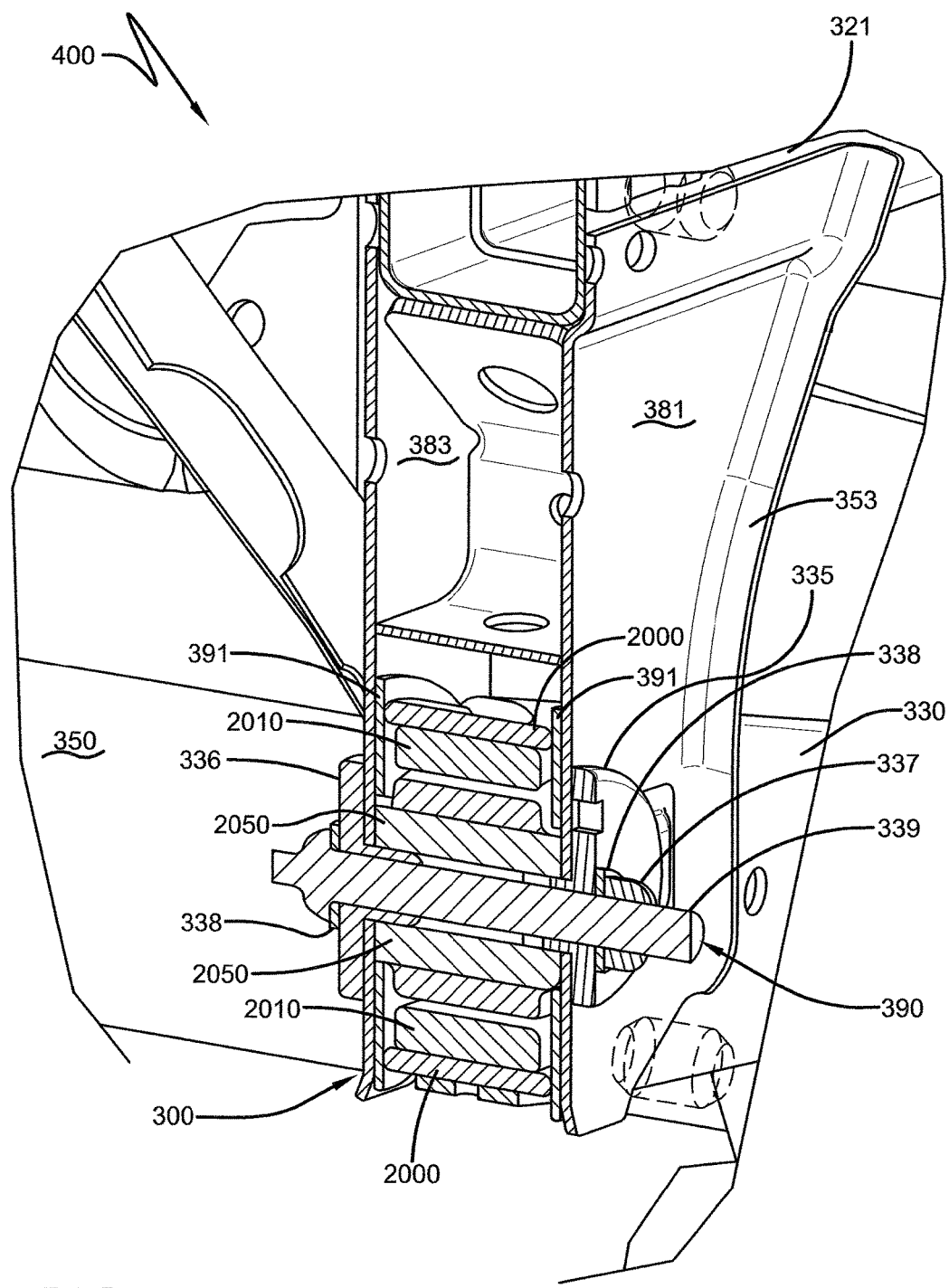
FIG. 7 is a fragmentary perspective view, partly in section, of the pivotal connection illustrated in FIG. 5.

Pivotal connection 300 is provided between hanger 323 and beam 330 for mounting the suspension assembly on frame 400. More particularly, the suspension assembly is pivotally connected to hanger 323 via trailing arm beam 330 and bushing assembly 324. Beam 330 can have an inverted U-shaped vertical or closed box cross-section. Beam 330 includes a front end portion 333 where bushing assembly 324 is disposed to facilitate pivotal connection 300 of beam 330 to hanger 323. Beam 330 also includes a rear end portion (not shown), which is welded or otherwise rigidly attached to a transversely extending axle 350 of the axle/suspension system (FIG. 7). Each suspension assembly also includes an air spring (not shown), mounted on and extending between the beam rear end portion and its respective main member 321.

With reference to FIGS. 5-10, bushing assembly 324 includes a beam mounting tube 2000 which is welded to beam front end portion 333. A bushing 2010 is press-fitted into beam mounting tube 2000 so that beam mounting tube 2000 can rotate or pivot with respect to bushing 2010 during operation of the vehicle as is known in the art. Bushing 2010 includes an elastomeric, generally cylindrical-shaped body formed with a central opening 2040 in which tubular rigid bushing sleeve 2050 is friction fitted and bonded thereto at the peripheral surface of the bushing sleeve by any suitable adhesive. Bushing sleeve 2050 extends slightly outwardly from both ends of central opening 2040 of bushing 2010 to facilitate clamping between outboard and inboard hanger walls 381, 383 by inserting bolt 339 of fastener group 390 through an aligned pair of hanger wall openings 385 (FIGS. 8 and 9) and a sleeve central continuous opening 2060 and a pair of wear pads 391. Wear pads 391 are formed of any suitable plastic, each one of the pair being loosely disposed over a respective one of the ends of bushing sleeve 2050. The bushing may be a TRI-FUNCTIONAL® bushing, available from Hendrickson USA, L.L.C., Canton, Ohio USA, applicant of the subject disclosure.

Figure 8:
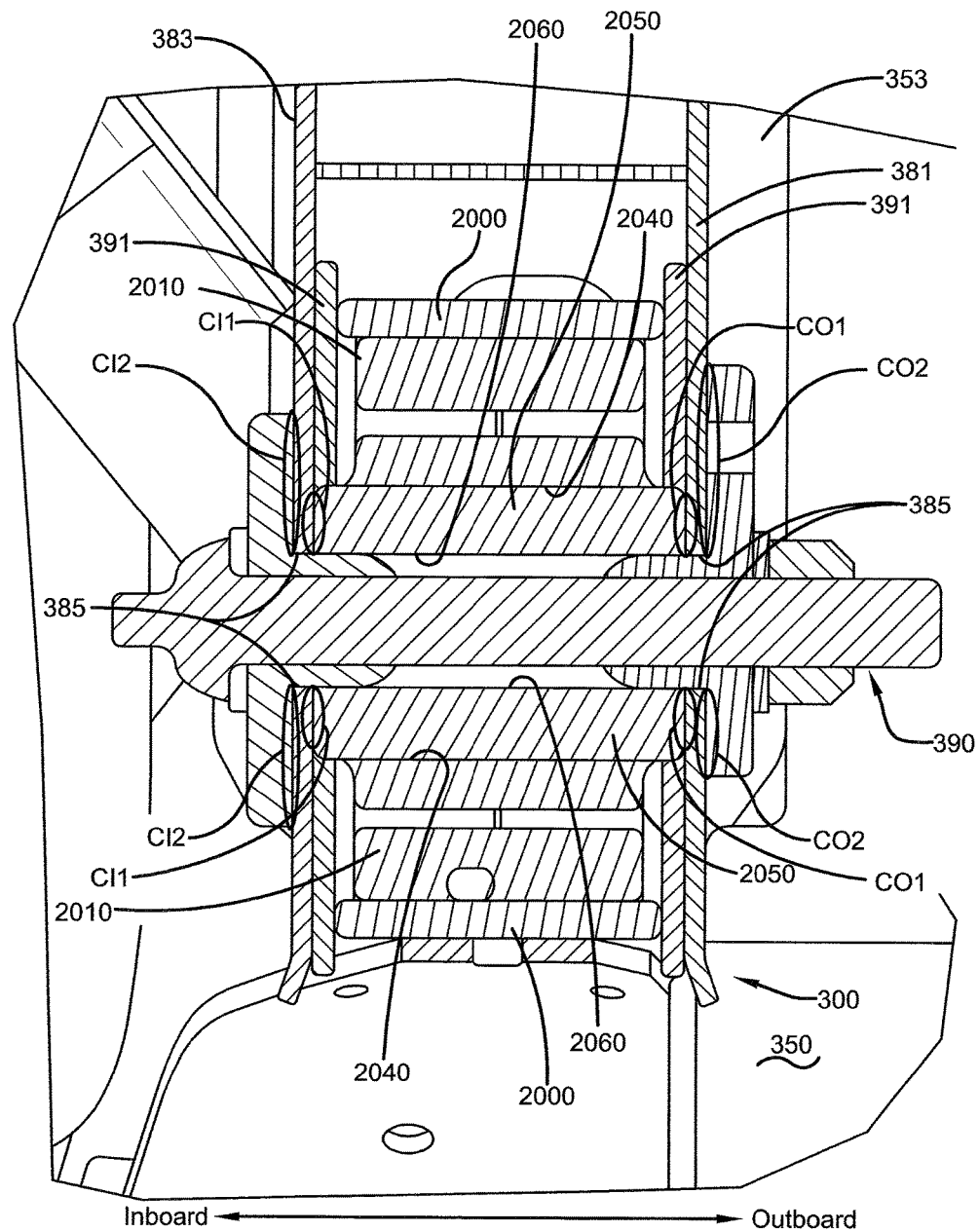
FIG. 8 is a fragmentary elevational view, partly in section, of the pivotal connection illustrated in FIG. 7.
Figure 9:
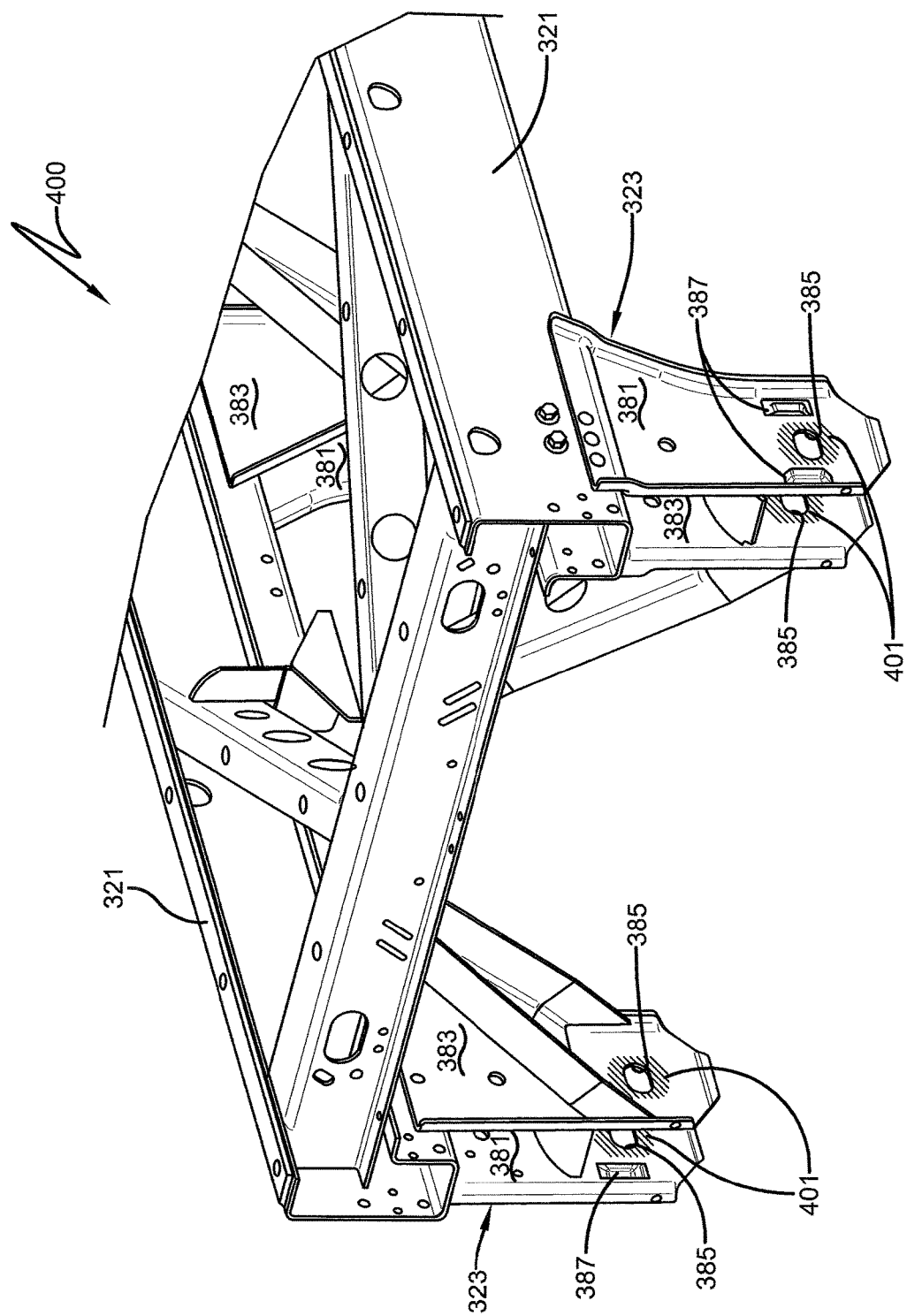
FIG. 9 is a fragmentary perspective view of a heavy-duty vehicle frame incorporating a portion of a pivotal connection, and showing hangers with textured features.

Each hanger wall 381, 383 has an outboard surface, an inboard surface and an opening 385 (FIGS. 7-9). Openings 385 in walls 381, 383 are transversely aligned. Bushing sleeve 2050 of bushing 2010 in bushing assembly 324 is disposed between outboard and inboard walls 381, 383 so that sleeve continuous opening 2060 is aligned with aligned openings 385 of the outboard and inboard walls. Once the three openings 385, 2060 are aligned with one another, an outboard end of bushing sleeve 2050 contacts an inboard surface of outboard wall 381, and an inboard end of bushing sleeve 2050 contacts an outboard surface of inboard wall 383. Bolt 339 passes through openings 385, 2060, and washers 338, and is threadably engaged with nut 337 thereby clamping bushing sleeve 2050 of bushing 2010 between outboard and inboard walls 381, 383 of hanger 323. The frictional contact caused by the clamping force between hanger walls 381, 383 and bushing sleeve 2050 applied by fastener group 390 enhances the engagement between hanger 323 and bushing assembly 324. Optionally, other members of fastener group 390, in addition to bolt 339, washers 338 and nut 337, such as eccentric member 335 and concentric member 336 could be utilized in the clamping engagement. Eccentric member 335 is captured by aligned guides 387 or the like formed on the outboard surface of outboard wall 381 of hanger 323, and enables adjustment of the alignment of the axle/suspension system. More preferably, eccentric member 335, concentric member 336 and their related components comprise a QUIK-ALIGN® pivotal connection, also available from Hendrickson USA, L.L.C., Canton, Ohio USA.

During manufacture/assembly, frame 400, including hangers 323, is coated with a protective medium such as wax or paint to prevent or minimize corrosion and other damage. In order to be coated in an economic manner, frame 400 is dipped in a bath of a protective medium such as wax or the like. Frame 400 is coated in such a manner after hangers 323 are connected to frame main members 321, and before each axle/suspension system is mounted on frame 400. The wax later hardens to form a protective coating on frame 400. It has been found that the coated outboard and inboard surfaces of hanger 323 have a relatively low coefficient of friction, which in turn adversely affects the secure clamping engagement formed between hanger 323, bushing sleeve 2050 and fastener group 390, once these clamp group components are aligned and fastened. This relatively reduced clamping engagement may allow unwanted relative movement of bushing sleeve 2050 with respect to hanger 323 in fore-aft, vertical and/or transverse directions, which can possibly cause undesirable wear and tear in contact areas formed between bushing sleeve 2050 and hanger walls 381, 383. The undesirable wear and tear can possibly harm the integrity of hanger 323 and bushing assembly 324, and therefore provide less than an optimum pivotal connection 300 between hanger 323 and beam 330 of the suspension assembly.

Figure 10:
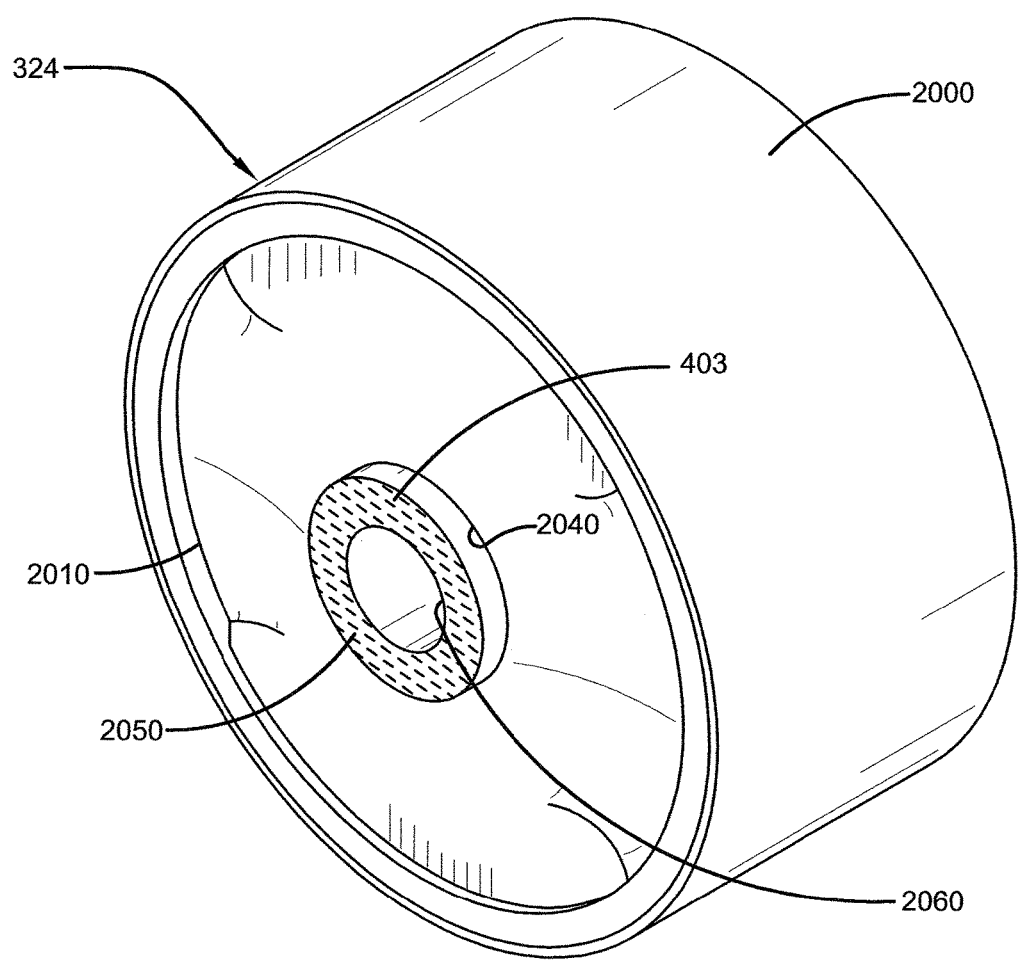
FIG. 10 is a perspective view of a portion of a bushing assembly according to one aspect of the invention.
Figure 11:
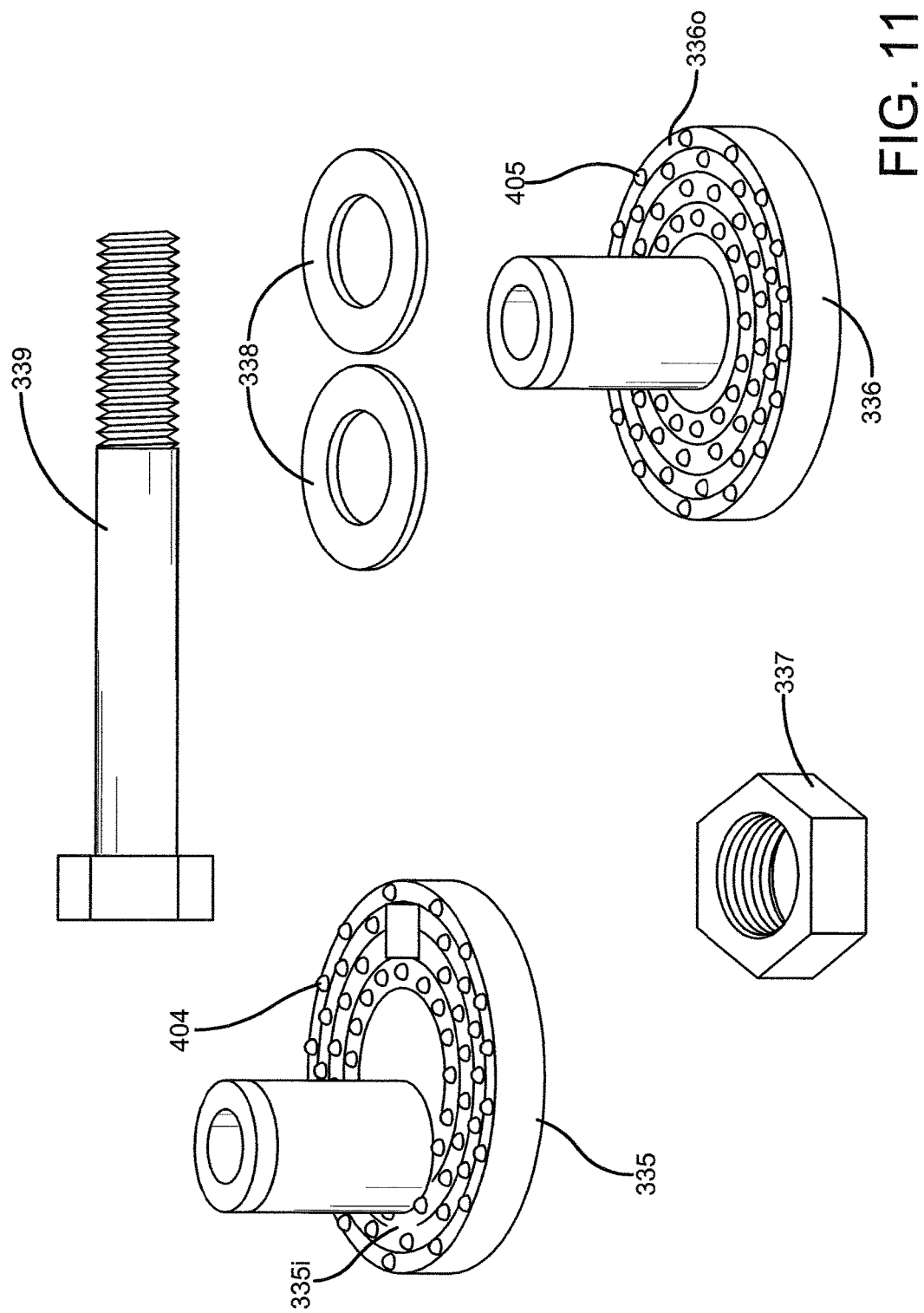
FIG. 11 is a perspective view of a portion of the pivotal connection, and showing certain components of a fastener group with textured features according to another aspect of the invention.
Figure 12:
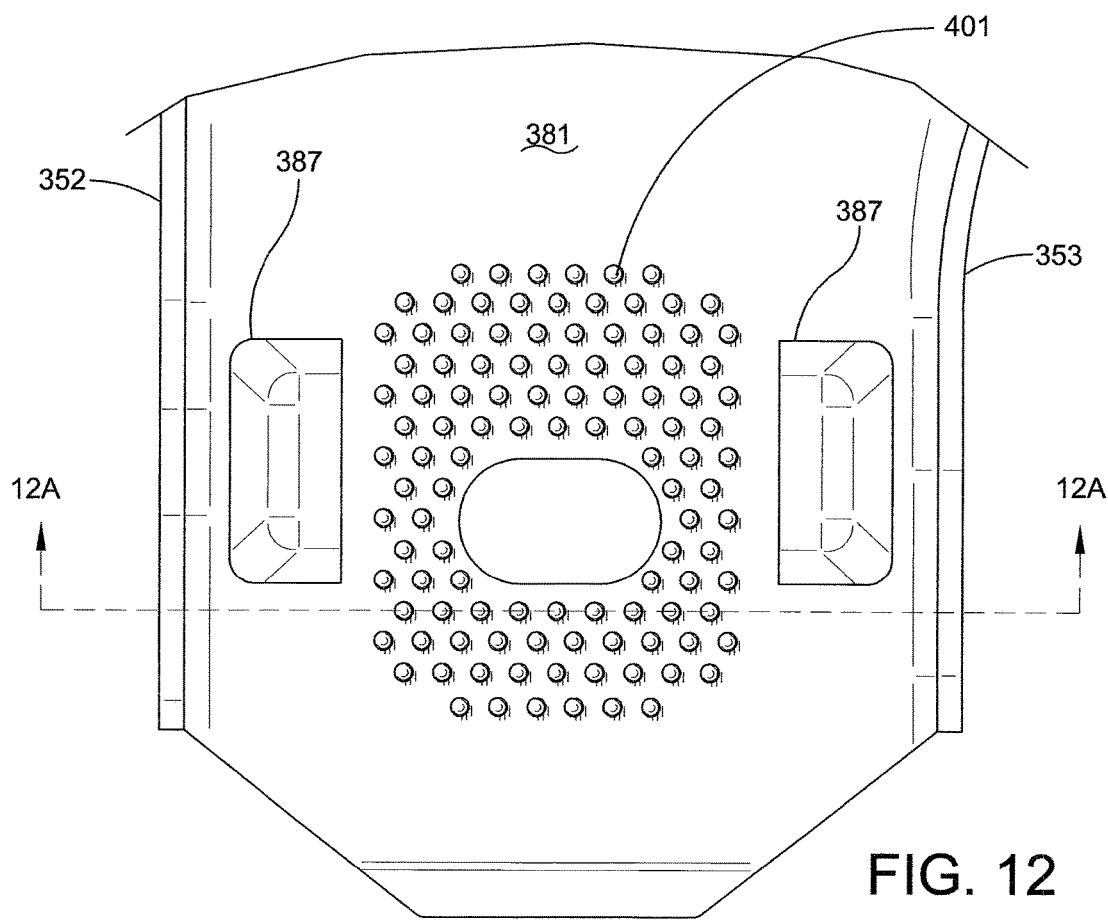
FIG. 12 is a fragmentary elevational view of the portion of a pivotal connection illustrated in FIG. 9.
Figure 12A:
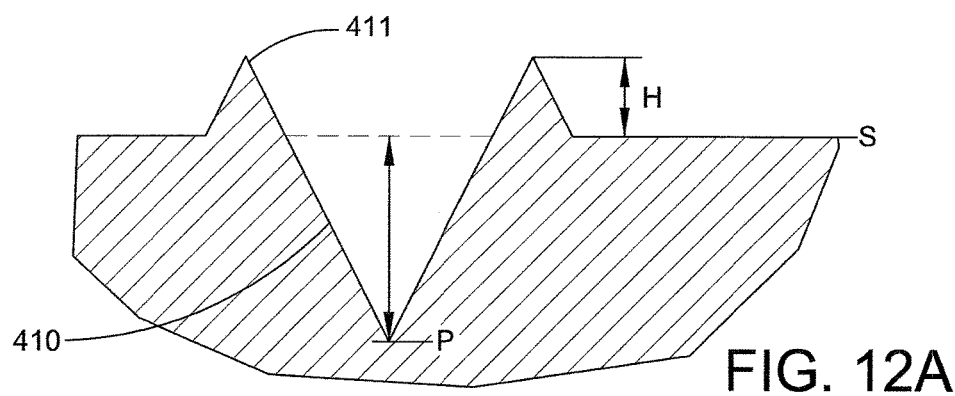
FIG. 12A is a greatly enlarged fragmentary cross-sectional view taken approximately along line 12A-12A in FIG. 12 of a portion of the pivotal connection.

In accordance with one of the primary features of the disclosed subject matter, textured features 401, 403, 404 and 405 are formed in contact areas in hanger 323, and/or in bushing assembly members such as bushing sleeve 2050, and/or in fastener group members such as eccentric member 335 or concentric member 336 to enhance the clamping engagement between hanger 323 and bushing assembly 324 (FIGS. 10-12). This enhanced clamping engagement optimizes the desired pivotal connection between hanger 323 and beam 330 by inhibiting the unwanted possible relative movement of bushing sleeve 2050 with respect to hanger 323 in fore-aft, vertical and/or transverse directions, and in turn reduces undesirable wear and tear in the contact areas. The enhanced clamping engagement provided by the textured features overcomes above-described adverse effect of the protective coating medium as wax, and does not harm the integrity of hanger 323 and/or bushing assembly 324 and in turn provides the desired pivotal connection between the hanger and beam 330 of the suspension assembly.

With particular reference to FIG. 8, the contact areas are shown and referred to as CI1, CI2, CO1 and CO2. The textured features can be formed in any contact area of hanger 323 to bushing assembly 324, CI1 and CO1, and the hanger to concentric member 336 and eccentric member 335, CI2, CO2, respectively. More specifically, an inboard end of bushing sleeve 2050 of bushing assembly 324 contacts an outboard surface of inboard wall 383 at a first inboard contact area CI1. First inboard contact area CI1 includes the inboard end of bushing sleeve 2050 and the outboard surface of inboard wall 383. The inboard end of bushing sleeve 2050 of first inboard contact area CI1 and/or the outboard surface of inboard wall 383 of first inboard contact area CI1 may include textured features 403 (FIG. 10), 401 (FIG. 9), respectively. Textured features 403, 401 inhibit the relative movement of bushing sleeve 2050 with respect to inboard wall 383 of hanger 323 in fore-aft, vertical and/or transverse directions, whereby the adverse effect of the protective coating medium such as a waxy relatively slippery surface of inboard wall 383 is compensated for or overcome. Accordingly, first inboard contact area CI1 enables an enhanced clamping engagement to be provided between the inboard end of bushing sleeve 2050 and the outboard surface of inboard wall 383. Preferably, the textured contact area of the outboard surface of inboard wall 383 generally surrounds opening 385 for at least the diameter of bushing sleeve 2050.

An outboard end of bushing sleeve 2050 of bushing assembly 324 contacts an inboard surface of outboard wall 381 at a first outboard contact area CO1. First outboard contact area CO1 includes the outboard end of bushing sleeve 2050 and the inboard surface of outboard wall 381. The outboard end of bushing sleeve of first outboard contact area CO1 and/or the inboard surface of outboard wall 381 of first outboard contact area CO1 may include textured features 403 (FIG. 10), 401 (FIG. 9), respectively. Textured features 403, 401 inhibit the relative movement of bushing sleeve 2050 with respect to outboard wall 381 of hanger 323 in fore-aft, vertical and/or transverse directions, whereby the adverse effect of the protective coating medium such as a waxy relatively slippery surface of outboard wall 381 is compensated for or overcome. Accordingly, first outboard contact area CO1 enables an enhanced clamping engagement to be provided between the outboard end of bushing sleeve 2050 and the inboard surface of outboard wall 381. Preferably, the textured contact area of the inboard surface of outboard wall 381 generally surrounds opening 385 for at least the diameter of bushing sleeve 2050.

An outboard surface 336o (FIG. 11) of concentric member 336 contacts an inboard surface of inboard wall 383 at a second inboard contact area CI2 is formed therein. Second inboard contact area CI2 includes concentric member outboard surface 336o and the inboard surface of inboard wall 383. Outboard surface 336o of concentric member 336 of second inboard contact area CI2 and/or the inboard surface of inboard wall 383 of the second inboard contact area may include textured features 405 (FIG. 11), 401 (FIG. 9), respectively. Textured features 405, 401 inhibit the relative movement of bushing sleeve 2050 with respect to inboard wall 383 of hanger 323 in fore-aft, vertical and/or transverse directions, whereby the adverse effect of the protective coating medium such as a waxy relatively slippery surface of inboard wall 383 is compensated for or overcome. Accordingly, second inboard contact area CI2 enables an enhanced clamping engagement to be provided between outboard surface 336o and the inboard surface of inboard wall 383. Preferably, the textured contact area of the inboard surface of inboard wall 383 generally surrounds opening 385 for at least the diameter of concentric member outboard surface 336o.

An inboard surface 335i (FIG. 11) of eccentric member 335 contacts an outboard surface of outboard wall 381 at a second outboard contact area CO2 is formed therein. Second outboard contact area CO2 includes eccentric member inboard surface 335i and the outboard surface of outboard wall 381. Inboard surface 335i of eccentric member 335 of second outboard contact area CO2 and/or the outboard surface of outboard wall 381 of the second outboard contact area may include textured features 404 (FIG. 11), 401 (FIG. 9), respectively. Textured features 404, 401 inhibit the relative movement of bushing sleeve 2050 with respect to outboard wall 381 in fore-aft, vertical and/or transverse directions, whereby the adverse effect of the protective coating medium such as a waxy relatively slippery surface of outboard wall 381 is compensated for or overcome. Accordingly, second outboard contact area CO2 enables an enhanced clamping engagement to be provided between inboard surface 335i and the outboard surface of outboard wall 381. Preferably, the contact area of the outboard surface of outboard wall 381 generally surrounds opening 385 for at least the diameter of eccentric member inboard surface 335i.

As described above, textured features 401, 403, 404 and 405 could be formed in inboard and/or outboard surfaces of outboard wall 381 and inboard wall 383, bushing sleeve 2050, eccentric member 335, and/or concentric member 336, respectively. By including the textured features in the contact area(s) of CI1, CI2, CO1, or CO2, the contact area(s) is/are provided with a sufficient clamping engagement therebetween. The enhanced clamping engagement provided by the textured features in the contact area(s) inhibits relative movement of bushing assembly 324 with respect to hanger 323 in fore-aft, vertical and/or transverse directions, and in turn reduces or overcomes undesirable wear and tear in the contact areas. As a result, the enhanced clamping engagement optimizes the desired pivotal connection 300 between hanger 323 and beam 330 of the suspension assembly through bushing assembly 324 and fastener group 390.

Textured features 401, 403, 404, and 405 could comprise a plurality of projections 411 which could be formed by displacing metal at a contact area through known forming techniques such as cold forming, stamping or roll forming. Projection 411 extends out from the contact area. Alternatively, projection 411 could be formed by depositing material to create a projection such as depositing metal, ceramic or polymer on the contact area. Projection 411 could have any optimum horizontal cross sectional shape such as a circular, oval, elliptical or polygonal shape. The projection could be made from any optimum materials such as metal, metal-alloy, plastic, ceramic, or polymer. A height of the projection is measured by and between a highest point H of the projection and surface S of respective structure including hanger wall(s) 381, 383, end(s) of bushing sleeve 2050, inboard surface 335i of eccentric member 335 or outboard surface 336o of concentric member 336. The height of the projection may be lower than a thickness of the protective medium such as wax. By way of example, the height of the projection may be in the range of about 0.002 mm (0.000078 inch) to about 0.254 mm (0.01 inch).

A plurality of depressions 410 could be formed by displacing metal during formation of the plurality of projections 411. Depression 410 could have any shape such as a conical, frusto-conical, cylindrical, pyramidal or polygonal shape. A depth of the depression is measured by and between the deepest point P of depression 410 and a surface S of respective structure including hanger wall(s) 381, 383, end(s) of bushing sleeve 2050, inboard surface 335i of eccentric member 335 or outboard surface 336o of concentric member 336. By way of example, the depth P to S of the dimple may be in the range of about 0.127 mm (0.005 inch) to about 1.524 mm (0.06 inch).

The textured features or projections 411 could be formed in any suitable pattern such as concentric circle, random pattern, and etc., with each textured feature arranged in spaced-apart, repeating parallel rows and columns. Such a pattern may readily and economically be formed through known forming techniques, and preferably cold forming techniques, such as stamping or roll forming.

It should be understood that pivotal connection 300 of the disclosed subject matter could be utilized on all types of heavy-duty axle/suspension systems without changing the overall concept or operation of the invention. Moreover, pivotal connection 300 of the disclosed subject matter could be utilized on lift axle/suspension systems that are steerable or non-steerable without changing the overall concept or operation of the disclosed subject matter. It is also understood that pivotal connection 300 of the disclosed subject matter could be utilized with other types of air spring axle/suspension systems without changing the overall concept or operation of the disclosed subject matter. It is further understood that pivotal connection 300 of the disclosed subject matter could be utilized on trucks, tractors, trailers, or other heavy-duty vehicles without changing the overall concept or operation of the disclosed subject matter. It is even further understood that pivotal connection 300 of the disclosed subject matter could be formed using other materials without changing the overall concept or operation of the disclosed subject matter. It is understood that pivotal connection 300 of the disclosed subject matter could be utilized on axle/suspension systems having either a trailing arm or leading arm configuration without changing the overall concept or operation of the disclosed subject matter. It is also understood that pivotal connection 300 of the disclosed subject matter could be utilized on various types of heavy-duty vehicle frames or sub-frames that mount axle/suspension systems without changing the overall concept or operation of the disclosed subject matter. It is also understood the exemplary embodiment pivotal connection 300 of the disclosed subject matter could have different general shapes, sizes, depths, and/or heights of a textured feature without changing the overall concept or operation of the disclosed subject matter. It is also understood the exemplary embodiment pivotal connection 300 of the disclosed subject matter could have different patterns of textured features without changing the overall concept or operation of the disclosed subject matter. It is further understood that the exemplary embodiment pivotal connection 300 of the disclosed subject matter could be utilized on various types of heavy-duty vehicle frames or sub-frames that are coated with a protective medium other than wax or paint.

What is claimed is:

1. A pivotal connection for a suspension assembly of an axle/suspension system for a heavy-duty vehicle in which said heavy-duty vehicle includes a frame, said pivotal connection comprising:
   a hanger connected to the frame of the heavy-duty vehicle, said hanger including at least one wall having an inner surface and an outer surface, said at least one wall defining an opening extending therethrough;
   a beam of the suspension assembly;
   a bushing assembly having a bushing sleeve, the bushing assembly being operatively connected to said beam for pivotally connecting the beam with the hanger;
   fastening means for securing said bushing assembly to said hanger; and
   a textured feature formed in a portion of at least one of said hanger wall inner surface, said hanger wall outer surface, and said bushing sleeve, said bushing sleeve being in contact with said hanger wall inner surface, wherein said textured feature inhibits relative movement of said bushing assembly in a fore-aft, vertical, and transverse direction with respect to said hanger.

2. The pivotal connection for an axle/suspension assembly of a heavy-duty vehicle of claim 1, wherein said portion of said hanger wall is formed with said textured feature on an inboard surface of an outboard hanger wall and on an outboard surface of an inboard hanger wall.

3. The pivotal connection for an axle/suspension assembly of a heavy-duty vehicle of claim 1, wherein said fastening means includes a concentric member disposed on an inboard wall of said hanger, wherein said textured feature is formed on an outboard surface of said concentric member.

4. The pivotal connection for an axle/suspension assembly of a heavy-duty vehicle of claim 1, wherein said fastening means includes an eccentric member disposed on an outboard wall of said hanger, wherein said textured feature is formed on an inboard surface of said eccentric.

5. The pivotal connection for an axle/suspension assembly of a heavy-duty vehicle of claim 1, wherein said textured features are formed in a predetermined pattern.

6. The pivotal connection for an axle/suspension assembly of a heavy-duty vehicle of claim 1, wherein said textured feature comprises at least one projection.

7. The pivotal connection for an axle/suspension assembly of a heavy-duty vehicle of claim 6, wherein said at least one projection is formed by displacing metal.

8. The pivotal connection for an axle/suspension assembly of a heavy-duty vehicle of claim 6, wherein said at least one projection includes a cross sectional shape taken in a plane parallel to said hanger wall and chosen from the group consisting of a circle, an oval, an ellipse or a polygon.

9. The pivotal connection for an axle/suspension assembly of a heavy-duty vehicle of claim 6, wherein said at least one projection includes a height in the range of about 0.002 mm (0.000078 inch) to about 0.254 mm (0.01 inch).

10. The pivotal connection for an axle/suspension assembly of a heavy-duty vehicle of claim 6, wherein said textured feature further includes at least one depression.

11. The pivotal connection for an axle/suspension assembly of a heavy-duty vehicle of claim 10, wherein said at least one depression includes a shape chosen from the group consisting a cone, a frusto-cone, a cylinder, a pyramid, or a polygon.

12. The pivotal connection for an axle/suspension assembly of a heavy-duty vehicle of claim 10, said at least one depression includes a depth in the range of about 0.127 mm (0.005inch) to about 1.524 mm (0.06 inch).

13. A hanger system fixed to a frame of a heavy-duty vehicle for mounting a beam of a suspension assembly of an axle/suspension system, said hanger system comprising:
   a hanger including at least one wall with an inner surface and an outer surface, said at least one wall defining an opening;
   a bushing assembly for disposition in the beam of the axle/suspension assembly, said bushing assembly including a bushing with a tubular bushing sleeve having a continuous opening extending through said tubular bushing sleeve;
   fastening means for connecting said hanger and said tubular bushing sleeve, said fastening means including a bolt, the fastening means clamping said bushing sleeve and said hanger wall together upon tightening of the bolt extending through the continuous opening of the bushing sleeve; and
   at least one textured feature formed in a portion of at least one of said hanger wall inner surface, said hanger wall outer surface, and said bushing sleeve, the textured feature being located adjacent the opening in the hanger wall to inhibit relative movement between said bushing assembly and said hanger in a fore-aft, vertical, and transverse direction.

14. A method for providing a pivotal connection for an axle/suspension assembly of a heavy-duty vehicle, said method comprising the steps of:
- providing a frame;
- providing a hanger including at least one wall with an inner surface, an outer surface and an opening;
- providing a bushing assembly for pivotally connecting said hanger and said beam, said bushing assembly including a bushing with a tubular bushing sleeve;
- forming at least one textured feature in a portion of at least one of said hanger wall inner surface adjacent the opening, said hanger wall outer surface adjacent the opening, and said bushing sleeve;
- connecting said hanger to said frame;
- coating said hanger and said frame with a protective medium;
- mounting a beam of the suspension assembly for pivotal connection to the hanger; and
- said mounting step including:
  - providing fastening means for connecting said hanger and said bushing sleeve, said fastening means including at least a bolt and a nut;
  - inserting the bolt through the hanger wall opening and the tubular bushing sleeve; and
  - clamping the tubular bushing sleeve with said hanger by tightening the bolt and the nut to inhibit relative movement of said bushing assembly in a fore-aft, vertical, and transverse direction with respect to said hanger.

* * * * *

UNITED STATES PATENT AND TRADEMARK OFFICE
CERTIFICATE OF CORRECTION

PATENT NO. : 10,017,020 B2
APPLICATION NO. : 15/372541
DATED : July 10, 2018
INVENTOR(S) : Jacob D. Andreasen and Jason M. Ramus It is certified that error appears in the above-identified patent and that said Letters Patent is hereby corrected as shown below:

In the Claims

Amend Claim 8, Column 12, Line 27, after the word "ellipse", replace the word "or" with the word --and--.

Amend Claim 11, Column 12, Line 38, after the word "pyramid" replace the word "or" with the word --and--.

Signed and Sealed this
Twenty-first Day of August, 2018

Andrei Iancu
*Director of the United States Patent and Trademark Office*